US010485056B2

United States Patent
Schantz et al.

(10) Patent No.: US 10,485,056 B2
(45) Date of Patent: Nov. 19, 2019

(54) SENSOR BASED INTERFACE ADJUSTMENT

(71) Applicant: Lenovo (Singapore) Pte. Ltd., Singapore (SG)

(72) Inventors: Daniel Jordan Schantz, Raleigh, NC (US); Vincent Charles Conzola, Raleigh, NC (US); Wesley Abram Luttrell, Raleigh, NC (US); Christopher Miles Osborne, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 424 days.

(21) Appl. No.: 14/881,297

(22) Filed: Oct. 13, 2015

(65) Prior Publication Data

US 2017/0103732 A1 Apr. 13, 2017

(51) Int. Cl.
*G06F 3/048* (2013.01)
*H04W 88/02* (2009.01)
*G06F 3/0487* (2013.01)
*G06F 1/16* (2006.01)
*G09G 5/00* (2006.01)

(52) U.S. Cl.
CPC .......... *H04W 88/02* (2013.01); *G06F 1/1684* (2013.01); *G06F 1/1686* (2013.01); *G06F 3/0487* (2013.01); *G09G 5/00* (2013.01); *G09G 2340/0464* (2013.01); *G09G 2340/14* (2013.01); *G09G 2354/00* (2013.01)

(58) Field of Classification Search
CPC .. G06F 3/048; G06F 3/04842; G06F 3/04845; G06F 3/046; G06F 3/0483; G06F 3/04883; G06F 3/0304; G06F 2203/04108; G09G 5/38; H04W 88/02
See application file for complete search history.

(56) References Cited

U.S. PATENT DOCUMENTS

| | | | |
|---|---|---|---|
| 8,769,431 B1* | 7/2014 | Prasad | G06F 3/048 715/764 |
| 9,075,514 B1* | 7/2015 | Karakotsios | G06F 3/04842 |
| 2009/0160792 A1* | 6/2009 | Morohoshi | G06F 1/1626 345/173 |
| 2011/0087963 A1* | 4/2011 | Brisebois | G06F 3/03547 715/702 |
| 2011/0169868 A1* | 7/2011 | Amemiya | G06F 1/1626 345/676 |
| 2013/0093680 A1* | 4/2013 | Ogita | G06F 1/1626 345/168 |
| 2014/0181721 A1* | 6/2014 | Buck | G06F 3/04886 715/773 |
| 2015/0178348 A1* | 6/2015 | Rohde | G06F 17/30377 707/734 |

(Continued)

*Primary Examiner* — Jeanette J Parker
(74) *Attorney, Agent, or Firm* — Schwegman Lundberg & Woessner, P.A.

(57) ABSTRACT

A method includes sensing a hand position on a mobile device via sensors on the mobile device, providing information identifying the sensed hand position to a processor of the mobile device, identifying a position of a user interface on a touch screen display of the mobile device responsive to the information identifying the sensed hand position using the processor of the mobile device, and adjusting a user interface display position on the mobile device to the identified position using the processor of the mobile device.

10 Claims, 11 Drawing Sheets

(56) References Cited

U.S. PATENT DOCUMENTS

| | | | |
|---|---|---|---|
| 2015/0302554 A1* | 10/2015 | Costa | G06F 3/041 345/174 |
| 2016/0188085 A1* | 6/2016 | Leigh | G06F 3/0416 345/174 |
| 2017/0060391 A1* | 3/2017 | Jun | G06F 3/0488 |

* cited by examiner

| | 910 | 920 | 930 | 940 | 950 |
|---|---|---|---|---|---|
| | MODE | LEFT HAND | RIGHT HAND | ORIENTATION | UE POSITION |
| | CAMERA | LOWER LEFT | NA | PORTRAIT | A XXX.YYY |
| | CAMERA | MIDDLE LEFT | NA | LANDSCAPE | A XXX.YYY |
| | TEXT READING | MIDDLE LEFT | NA | PORTRAIT | A XXX.YYY |
| | TEXT READING | LOWER LEFT | LOWER RIGHT | LANDSCAPE | B XXX.YYY |
| | TEXT READING | MIDDLE LEFT | LOWER RIGHT | PORTRAIT | B XXX.YYY |
| | ... | ... | ... | ... | C XXX.YYY |
| | ... | ... | ... | ... | C XXX.YYY |

SENSOR BASED INTERFACE ADJUSTMENT

BACKGROUND

User interfaces for mobile devices are generally fixed in position on a display screen of the mobile device. Some devices may change the orientation of the interface being displayed corresponding to the orientation of the device, such as between a landscape and a portrait orientation.

SUMMARY

A method includes sensing a hand position on a mobile device via sensors on the mobile device, providing information identifying the sensed hand position to a processor of the mobile device, identifying a position of a user interface on a touch screen display of the mobile device responsive to the information identifying the sensed hand position using the processor of the mobile device, and adjusting a user interface display position on the mobile device to the identified position using the processor of the mobile device.

A further method includes periodically sensing user hand positions on a mobile device having a touch screen display while the user is holding the mobile device, generating a heat map indicative of frequency of hand positions for each application executing on the mobile device, identifying a user interface element for an application currently executing on the mobile device, and adjusting a position of the user interface element of the currently executing application on the touch screen responsive to the heat map for the currently executing application.

A mobile computing device including a processor, a sensor array supported by the mobile computing device, the sensor array positioned to sense hand positions on the mobile computing device by a user using the device, and a memory device coupled to the processor and having instructions stored thereon. The instructions are executable by the processor to receive information identifying the sensed hand positions from the sensor array, identify an adjusted position of a user interface on a touch screen display of the mobile device responsive to the information identifying the sensed hand positions, and move a user interface display position on the mobile device to the identified adjusted position.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Current mobile interface designs have static locations for virtual buttons and controls. Such static locations may become difficult to reach when the devices are held by one hand of a user. Many times, users strain their hands to reach a virtual button or control, or may be forced to user a second hand to make a selection. The problem may be exacerbated when the mobile devices are larger, such as tablet or phablet, where the virtual buttons or control may be unreachable by the hand holding the device.

User interface elements may be repositioned on a touchscreen display of a mobile device responsive to sensed data representative of hand position on the mobile device. Sensors may be disposed about the mobile device to detect hand position on the mobile device. Touchscreen sensors may also be used to detect and provide sensed data regarding hand position and attempts to reach user interface elements. The sensed data may be used to move user interface elements, such as buttons and menus closer to the hand holding the mobile device, making one handed device use more convenient. The interface elements may also be modified to change active touch zones to result in a more accurate touch in order to select the interface elements.

In further embodiments, the repositioning of interface elements may be based on a history of sensed hand positions for each application that runs on the mobile device. If a user normally holds a device with one hand in a camera mode or application, a button to cause a picture to be captured may be repositioned proximate where the user normally holds the mobile device in camera mode responsive to entering camera mode regardless of where the user is holding the device prior to entering camera mode. Similarly, a history of the user holding the mobile device with one hand when reading text or in a particular application may be used to position one or more text navigation buttons, such as page up and page down, proximate the position where the user holds the mobile device responsive to text being displayed on the mobile device. The history of holding the mobile device may be referred to as heat maps, and may reflect holding by one or both hands and repositioning user interface elements accordingly for use by one or both hands.

Figure 1:
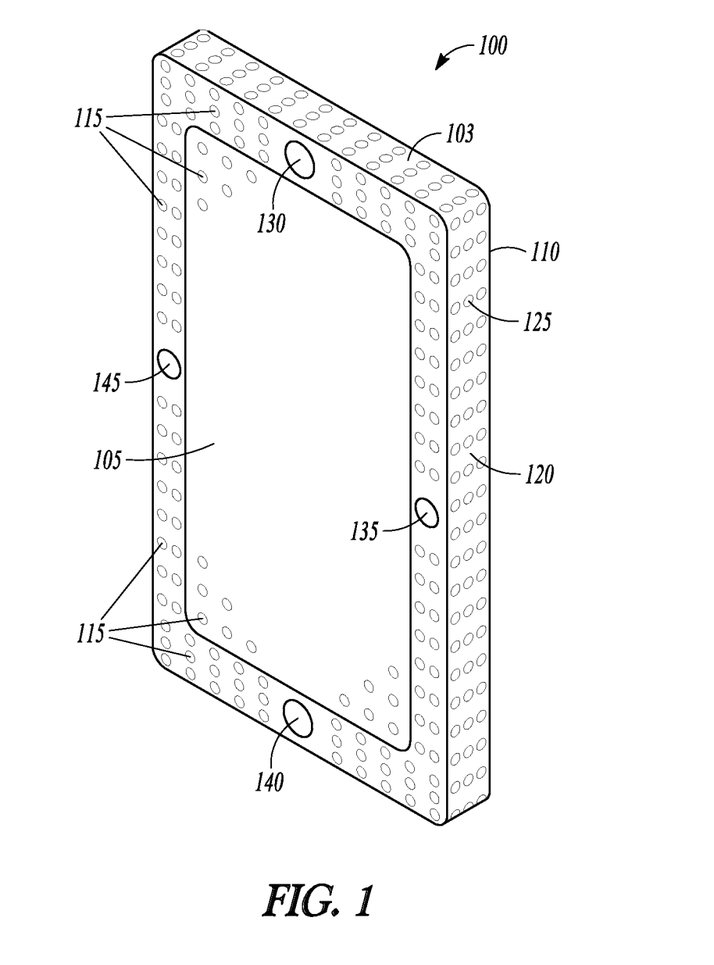
FIG. 1 is a perspective view of a hand held device having position sensing circuits according to an example embodiment.

FIG. 1 is a perspective view of a hand held device 100, such a mobile phone having position sensing circuits (e.g. resistive and capacitive sensors), piezoelectric materials or other position or pressure-sensing solutions supported by the hand held device. The sensing circuits may be embedded in or layered on top of a handheld device like a smartphone, smart watch or other hand held electronic device. The sensing technology may be positioned within a housing 103 such that one or more sides of the device, including a touch screen 105 side have pressing sensing capability and proximity sensing capability to indicate position of a finger which may be used for selecting a user interface element or elements which may be displayed on the touchscreen 105. Touch screen 105 may also include magnetic field disruption detection sensors capable of detecting a position of a finger proximate the touch screen and a distance of a finger or selection device from the screen.

In various embodiments, the term finger may also include an arm, pen or pointing device, knuckle, hand, and other body parts or objects. A user may be reaching over a table-top personal computer, in which case, their arm would be detected. A pen may be detected in a user's hand, or if a hand is dirty, the user may use a knuckle to make a selection. Contact mechanics applied to the device may also be detected. As a result, the sensing capability can detect fully where a user's fingers and hand are gripping the device 100.

Device 100 may also have pressure sensing capability on left and right sides, and a rear housing 110. An array of sensors 115, such as resistive and/or capacitive sensors, are represented as dots covering the device 100. The use of capacitive based sensors allows proximity detection of fingers positioned over the touch screen 105, allowing detection of a user's non-holding hand which may be used for selection of a user interface element. Note that while only a few sensors 115 are shown on screen 105 for an uncluttered view, the entire surface of screen 105 may be covered by sensors to enable position and distance detection in various embodiments. The user interface element may be a link or icon, menu, or other user selectable element. In one embodiment, the housing 103 in the case of the hand held device supporting interior electronics, buttons, and touch screen on a front side of the device 100 not visible in FIG. 1. In further embodiments, the housing 103 may take the form of an external case that is shaped to hold the device 100 and connect via one or more electrical connectors.

A side 120 of the housing 103 corresponds to an edge of the housing 103, and may also have sensors 125 embedded, layers on top of, or otherwise disposed on the side 120. Sensors 125 may also be similarly disposed on other sides of the housing 103. The sensors 115 and 125 may have pressing sensing capability to indicate contact mechanics applied to the device 100. As a result, this sensing capability can detect fully where a user's fingers and hand are gripping the device.

In one embodiment, a camera 130 may be disposed on a front of the device 100 containing the touch screen 105. The camera may provide images which may be processed via image analytics, allowing the detection of where fingers are positioned within a wide angle view of the camera. Multiple cameras 135, 140, 145 may be used in further embodiments and positioned near the sides and bottom of the device outside the touchscreen 105, or alternatively within the touchscreen area in further embodiments. Thus, finger position which may be used to select a user interface element on the touch screen 105 may be detected using cameras, the proximity sensors, or a combination of both.

Figure 2A:
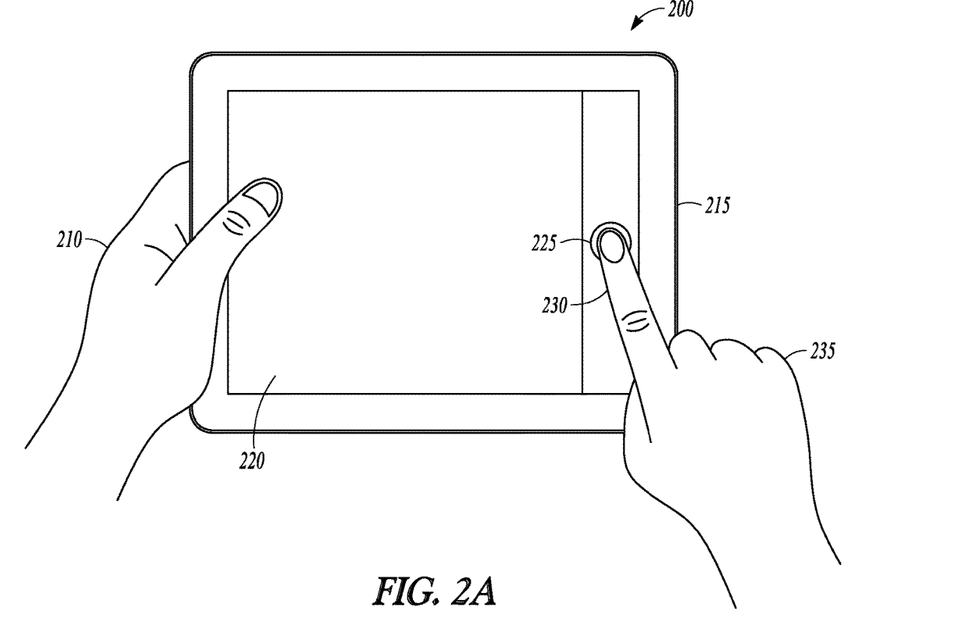
FIG. 2A is a block diagram depiction of a user holding a mobile device via a left hand on a left side of the mobile device according to an example embodiment.

FIG. 2A is a block diagram depiction of a user holding a mobile device 200 via a left hand 210 on a left side 215 of the mobile device 200. The mobile device 200 is being held by the left hand 210 and has a touch screen display 220 which is oriented in landscape mode. In this embodiment, the mobile device 200 is a tablet type device, but may also be any type of mobile device having a touch screen interface. A user interface element 225 is illustrated on a right side of the display 220 which may be selected by a finger 230 of a right hand 235 of the user.

Figure 2B:
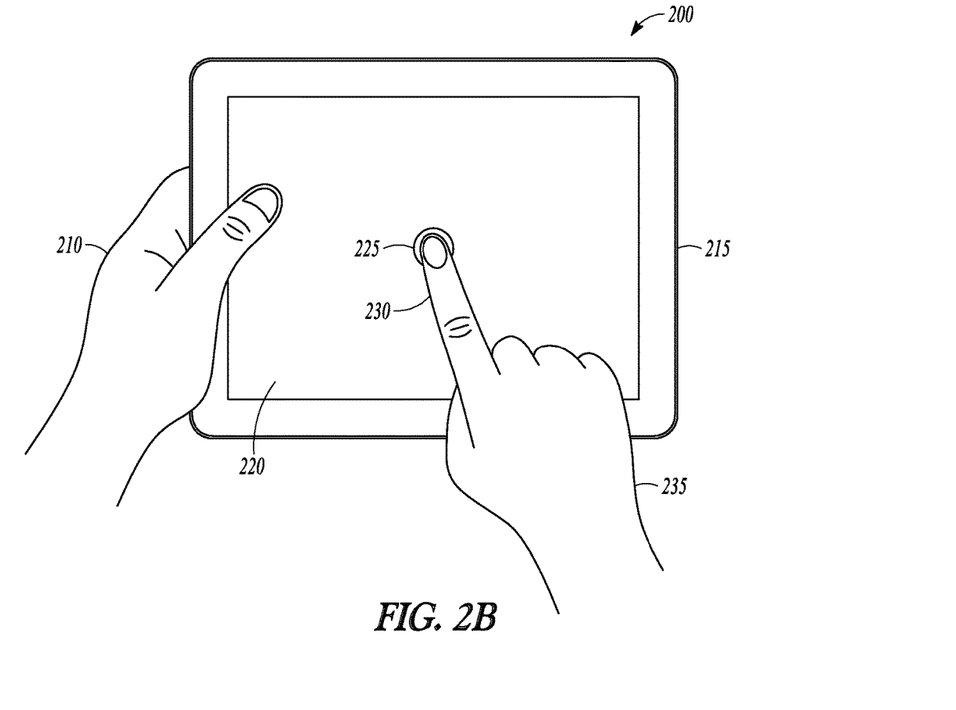
FIG. 2B is a block diagram depiction of the user holding the mobile device and adjusted interface element corresponding to a finger position according to an example embodiment.

FIG. 2B is a block diagram depiction of the user holding the mobile device 200 as in FIG. 2A. The reference numbers are the same as in FIG. 2B for like elements. In FIG. 2B, the user's finger 230 has moved towards a middle of the touch screen 220 indicated at 240. The hand 210 position has been sensed by the array of sensors 115, and the user's finger 230 position has also been sensed. The sensed information has been provided to the mobile device processor and used to determine that the user interface element 225 should be moved corresponding to the detected position of the finger, which is the likely implement to be used to select the user interface element 225 to cause a picture to be taken. In some embodiment, the mode or application being used is also considered by the processor in determining a convenient position for the user interface element giving the holding position and finger position. In this embodiment, the user interface element is a camera button that has slid or been adjusted or otherwise moved to the nearest finger, which may be positioned above the display and simply moved to touch the display and hence the camera button to cause the picture to be captured.

Figure 2C:
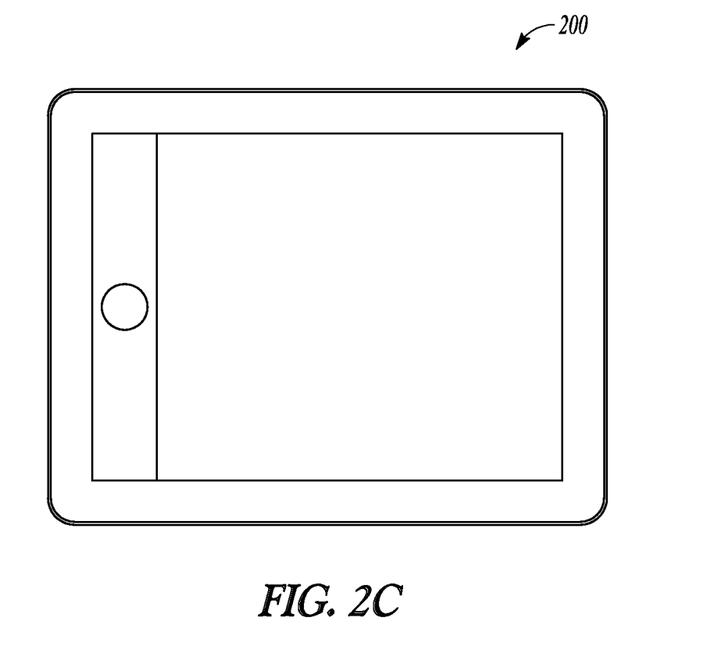
FIG. 2C is a block diagram depiction of the mobile device in camera mode with a landscape orientation and a user interface element pre-positioned proximate a holding position of the mobile device according to an example embodiment.

FIG. 2C is a block diagram depiction of the mobile device in camera mode with a landscape orientation and a user interface element pre-positioned proximate a holding position of the mobile device according to an example embodiment. In one embodiment, the user interface element may be positioned proximate previously sensed hand positions with the device operating in the orientation and mode. The user interface element may be positioned at that position when the camera mode is initially selected without regard to a current hand position on the mobile device. In further embodiments, the user interface element may be moved after the user holds the mobile device operating in the mode and orientation and may be moved based on the current sensed holding information. In still further embodiments, a time threshold may be used to determine when to move the user interface element or elements. The time threshold may be a number of seconds, such as three to five seconds for example, or other selected time during which the user is holding the mobile device in the same position.

Figure 3:
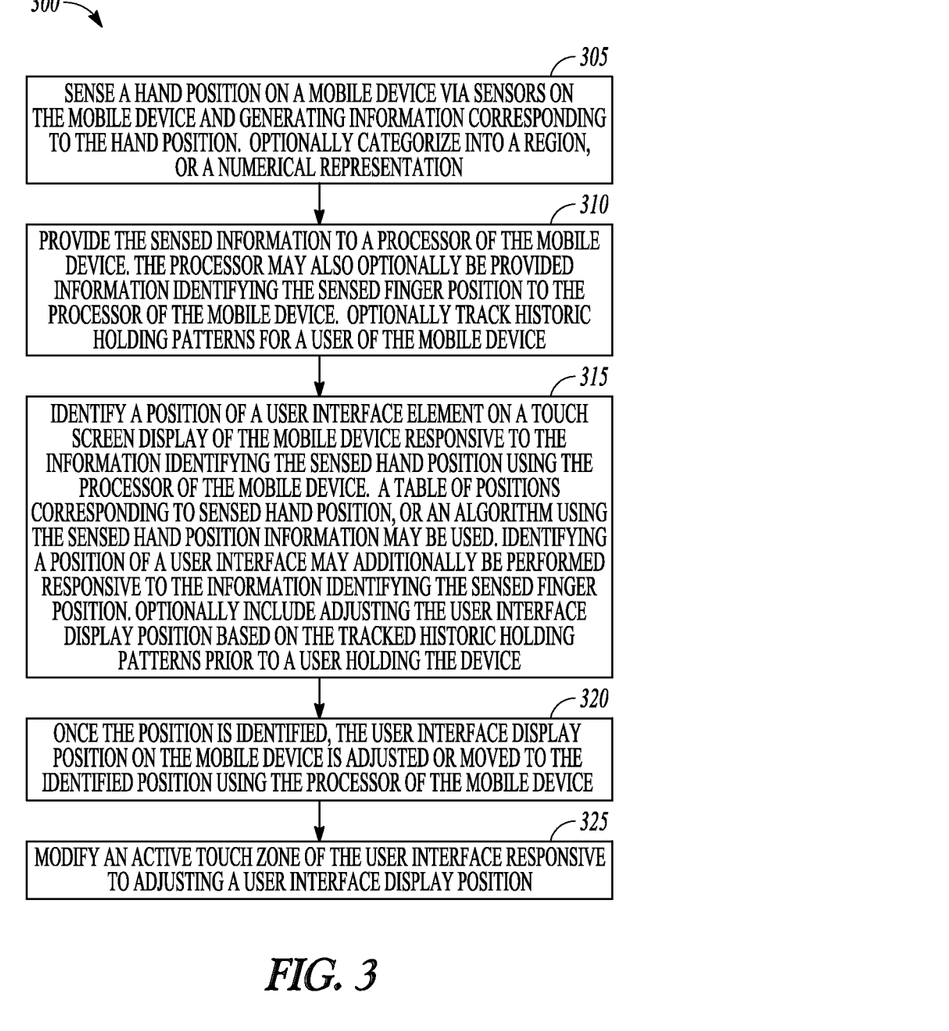
FIG. 3 is a flowchart illustrating a method performed by the processor to adjust a user interface element responsive to how a device is being held according to an example embodiment.

FIG. 3 is a flowchart illustrating a method 300 performed by the processor to adjust a user interface element responsive to how a device is being held. At 305, method 300 begins by sensing a hand position on a mobile device via sensors on the mobile device. In one embodiment, there may be a finite number of different holding positions into which the sensed hand position may be associated. Each edge of the device may be divided into multiple regions, such as two, three, four, or more regions. The sensed holding position may be associated with one of the regions based on the most sensors in a region detecting the hand holding the mobile device. The sensed information identifying the sensed hand position may be provided to the processor of the mobile device to make that association at 310.

At 315, a position of a user interface on a touch screen display of the mobile device may be identified responsive to the information identifying the sensed hand position using the processor of the mobile device. The position may be identified using the associated region which has a predetermined position of the user interface assigned to the region in one embodiment. The position may be assigned such that the user interface is positioned proximate the hand holding the device and is easy to reach in some embodiments. Once the position is identified, the user interface display position on the mobile device is adjusted or moved at 320 to the identified position using the processor of the mobile device.

In further embodiments, the hand position may be represented as a length along a side or sides of the device, and the identified position may be calculated based on the length. For instance, a device is usually held with the thumb in near the upper portion of such a line. In such a case, the identified position may be $\frac{1}{3}^{rd}$ of the distance of the line from the top of the line, or in the middle of the line, or some other selected proportion of the line, and offset from the edge of the display a selected distance to enable easy selection by a thumb of the hand holding the mobile device.

In still further embodiments, the position of a finger above the display may also be used to adjust a position of a user interface element. At 310, the processor may also optionally be provided information identifying the sensed finger position to the processor of the mobile device. At 315, identifying a position of a user interface is further optionally responsive to the information identifying the sensed finger position.

In one embodiment, at 325 an active touch zone of the user interface may be modified responsive to adjusting a user interface display position. In one embodiment, the active touch zone is reduced in size, such that selection of the user interface is recognized over a smaller area on the display. The user may be more precise in touching the screen to accomplish selection of the interface. In further embodiments, method 300 may further include tracking historic holding patterns for a user of the mobile device. Adjusting the user interface display position on the mobile device may also be responsive to the sensed hand position and includes adjusting the user interface display position based on the tracked historic holding patterns prior to a user holding the device.

Figure 4A:
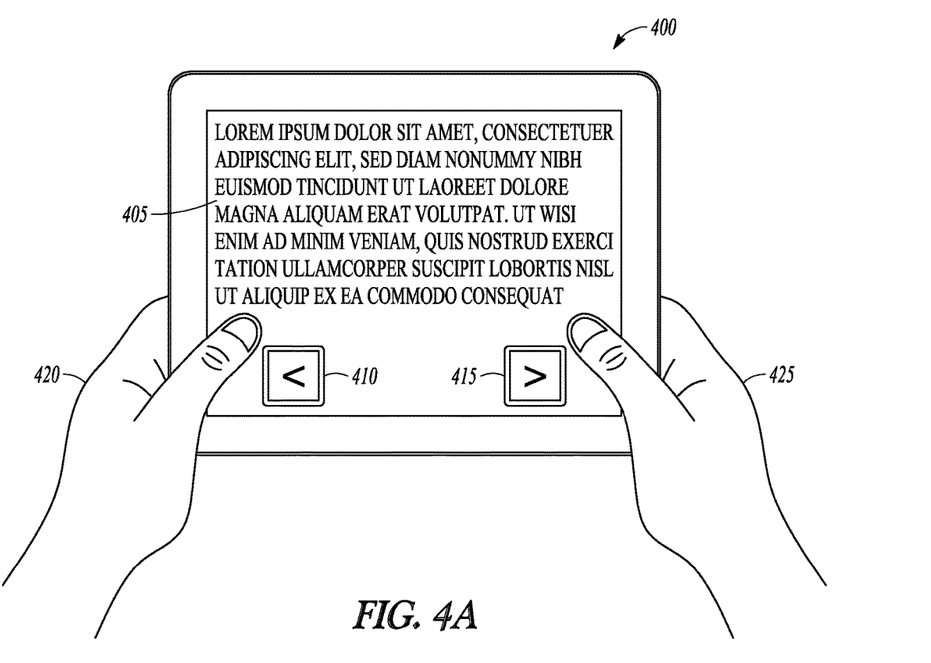
FIG. 4A is a block diagram depiction of a user holding a mobile device that is displaying text according to an example embodiment.

FIG. 4A is a block diagram depiction of a user holding a mobile device 400 that is displaying text 405. The text may be generated by a book application, a messaging application, a web site, a word processing application or any other application in various embodiments. Reading buttons 410 and 415 to scroll text in different directions are provided by the application. The reading buttons 410 and 415 may be page up and page down applications or may simply scroll text up or down, or left or right in different embodiments. As shown, the reading buttons 410 and 415 are virtual reading buttons or other user selectable interface elements that are positioned proximate a left hand 420 and a right hand 425, both of which having positions which may be sensed by the mobile device 400 array of sensors.

Figure 4B:
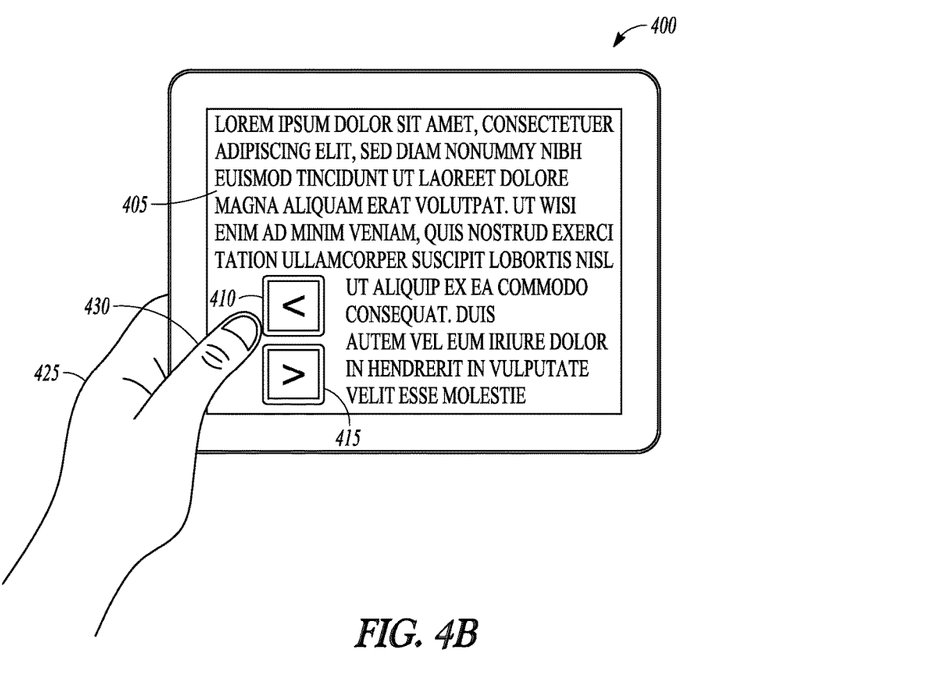
FIG. 4B is a block diagram depiction of a user holding a mobile device that is displaying text with adjusted user interface elements according to an example embodiment.

FIG. 4B is a block diagram depiction of the user holding the mobile device 400 that is displaying the same text 405. However, the device 400 is now being held only by the left had 420. The single hand holding position has been sensed, and the positions of the interface elements, reading buttons 410, 415, have now been moved proximate the position of the left hand 420 such that they are easily selectable by a finger, such as a thumb 430 of the left hand. Note also, that the movement of the interface elements has resulted in a reformatting of the text such that the interface elements do not cover any text. In this embodiment, the interface elements are positioned in a column next to or proximate to the position of the hand. Such a column orientation of the user interface elements facilitates easy selection by the thumb 430. To facilitate reformatting of the text, the processor is aware of the space available following adjustment of the positioning of the interface elements, and can easily reformat the text accordingly. Such reformatting functions are included in many word processing and browser programs which are executable by the processor.

Figure 5A:
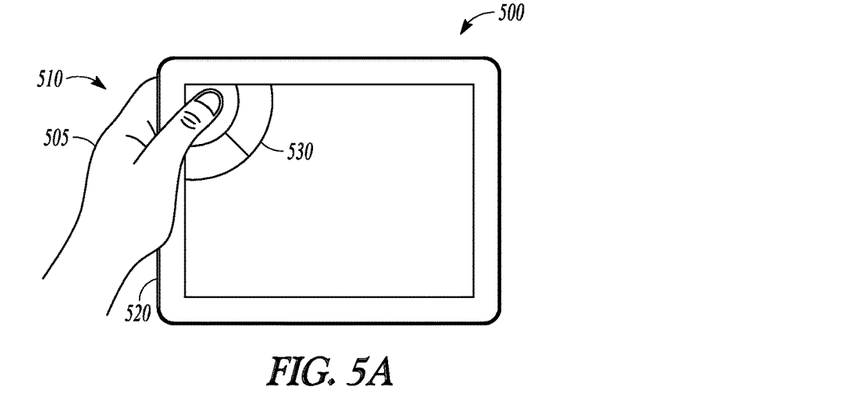
FIGS. 5A, 5B, and 5C are block diagram representations of a device being held by a single hand at different positions and a user interface element position adjusted along with the hand positions according to an example embodiment.
Figure 5B:
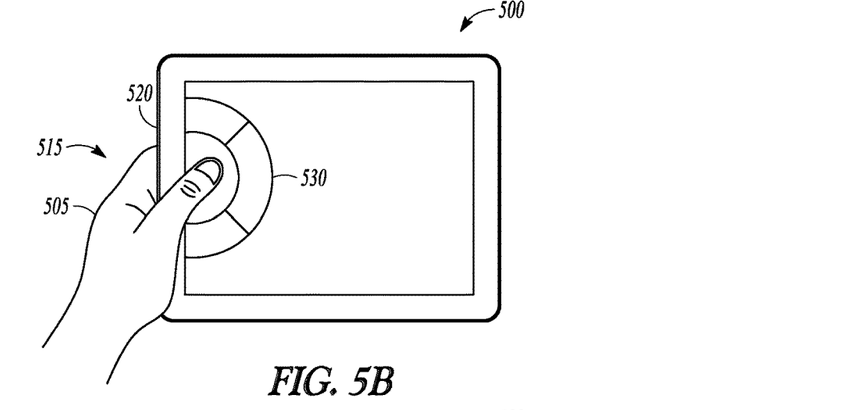
Figure 5C:
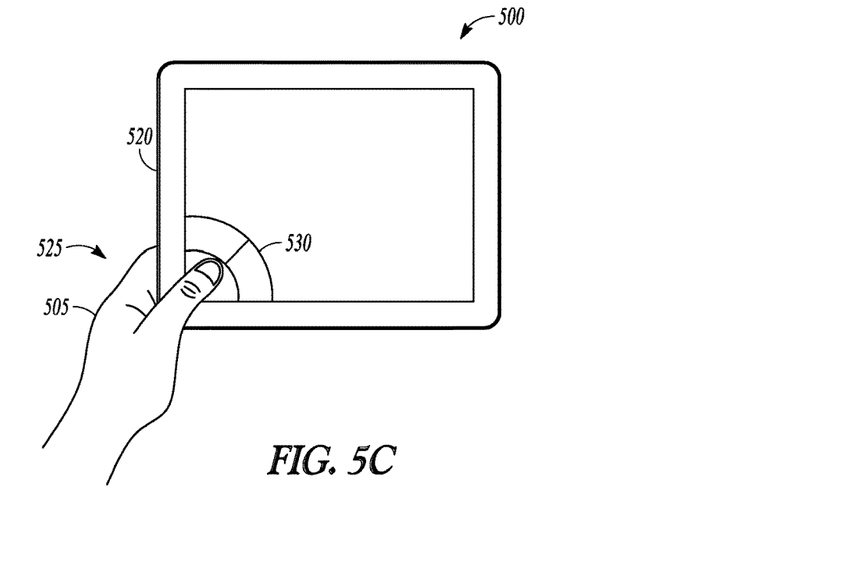

FIGS. 5A, 5B, and 5C are block diagram representations of a device 500 being held by a single hand 505 at different positions 510, 515, and 520 on a side 520 of the device 500. A user interface element comprising a menu wheel 530 is shown tracking along with the hand positions to facilitate ease of use of the menu wheel 530 regardless of the hand position. Note that in the case of using regions to categorize hand positions, three such regions may be used in FIGS. 5A, 5B, and 5C. In the case of simply algorithmically selecting proximate user interface element positions corresponding to sensed hand positions, similar results may be obtained, but may result in more positions depending on actual positioning of the hand. Such selection also may result in a more consistent feel for a user, as the user interface will more consistently be in the same position relative to the hand position on the device 500.

Figure 6:
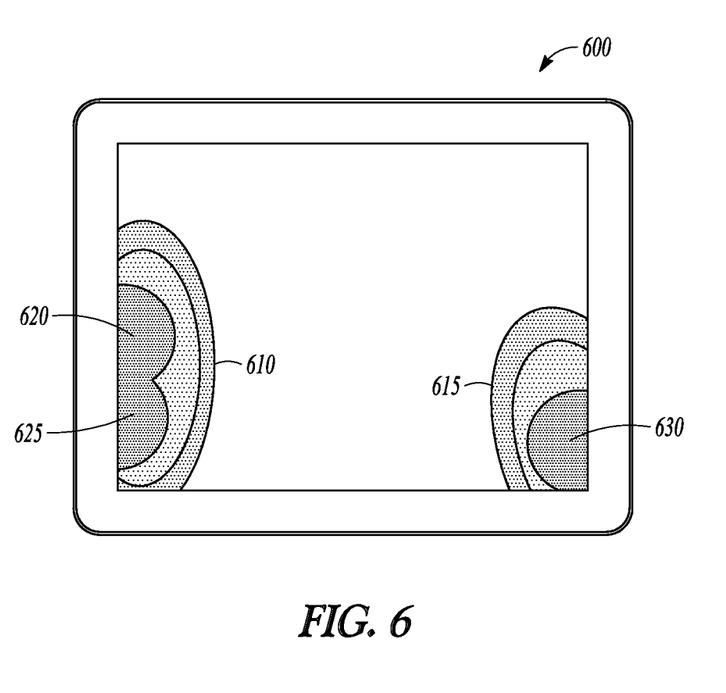
FIG. 6 is a block diagram representation of a device showing heat maps corresponding to historical holding patterns according to an example embodiment.

FIG. 6 is a block diagram representation of a device 600 showing heat maps corresponding to historical holding patterns. A heat map is a representation of a number of occurrences of different hand positions on the device 600. A frequency of the holding positions is illustrated by the heat map. In FIG. 6, heat map 610 illustrates the occurrences of holding the device by the left hand of a user, and heat map 615 illustrates the occurrences of holding the device by the right hand of the user. The shading of the heat map illustrates two "hot" areas 620 and 625 for the left hand, and one "hot" area 630 for the right hand. It appears that the hot area 620 is slightly larger than hot area 625, meaning that the user more frequently holds device 600 with the left hand positioned a little less than halfway up the display.

A center of the hot spots may be calculated using averages of the hand positions over a selected period of time or selected number of measurements such as 100, or other selected number. In some embodiments, hand position information may be provided by the sensor array every few seconds or other selectable interval. More recent information may be weighted more heavily in some embodiments. The hot spot 630 shows that the user consistently holds the device with the right hand in the lower left side of the device 600.

Figure 7A:
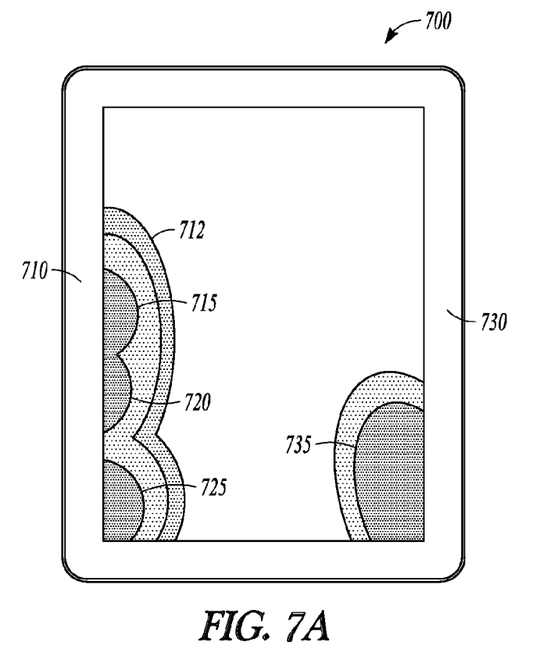
FIG. 7A illustrates heat maps for a device held in portrait orientation as opposed to the landscape orientation according to an example embodiment.
Figure 7B:
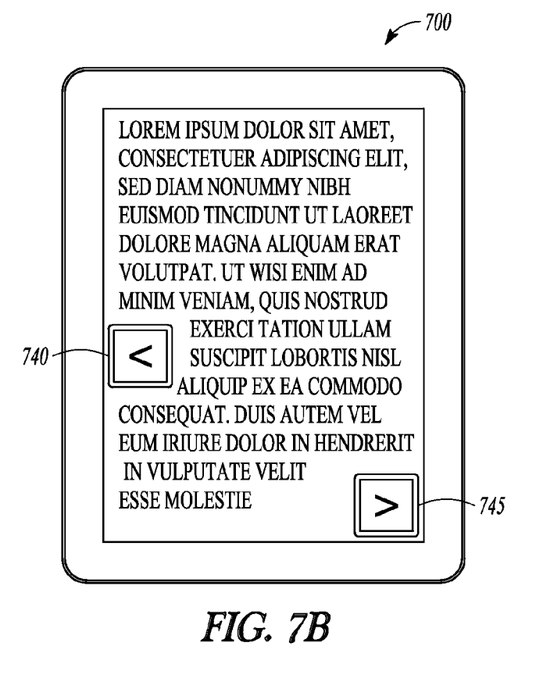
FIG. 7B illustrates example user interface elements positioned near the most likely holding positions by the left and right hands as calculated from the heat maps of FIG. 7A according to an example embodiment.

FIGS. 7A and 7B illustrate heat maps for a device 700 held in portrait orientation as opposed to the landscape orientation of device 600. The left side 710 of the device 700 is longer in portrait orientation, resulting in an example left hand position heat map 712 having three hot areas 715, 720, and 725. The right side 730 of the device 700 has a less hot, hot area 735 corresponding to the right hand positions, which is generally lower on the right side 730 of the device 700.

FIG. 7B illustrates example user interface elements 740 and 745 positioned near the most likely holding positions by the left and right hands as calculated from the heat maps.

Figure 8A:
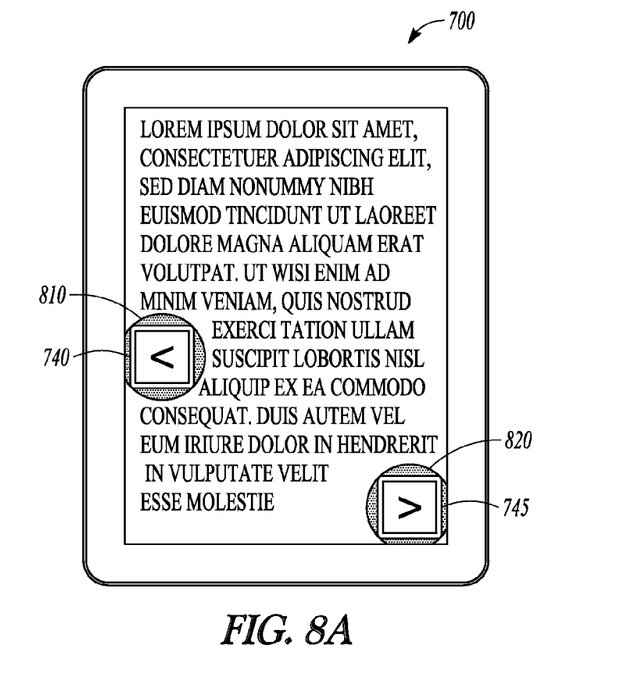
FIG. 8A illustrates different types of heat maps that are based on attempted selections of the user interface elements according to an example embodiment.

FIG. 8A illustrates different types of heat maps that are based on attempted selections of the user interface elements 740 and 745. A heat map 810 illustrates positions of the display that are touched in attempts to select interface element 740. Most of the touches correspond well with the position of interface element 740. Heat map 815 illustrates positions of the display that were touched in attempts to select interface element 745. Note that the heat map 815 appears to be shifted upward and inward from the actual position of interface element 745.

Figure 8B:
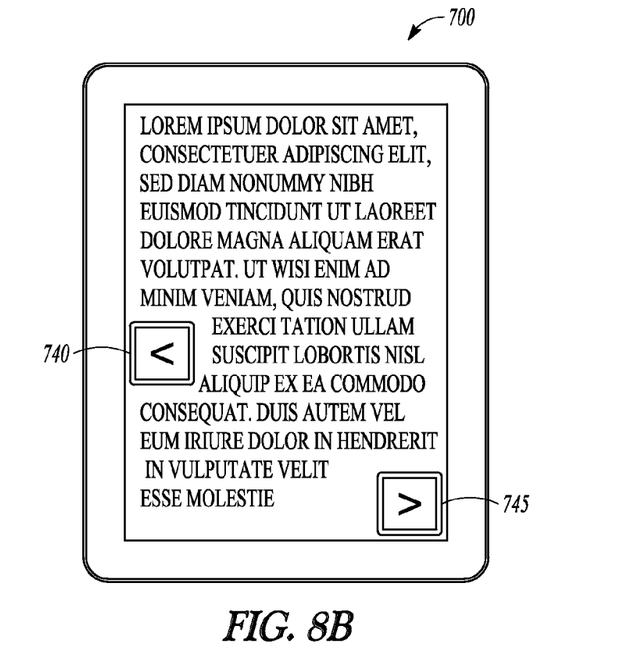
FIG. 8B illustrates an adjusted position of one or more of the interface elements based on the heat maps of FIG. 8A according to an example embodiment.

FIG. 8B illustrates an adjusted position of one or more of the interface elements. Since heat map 815 appeared shifted upward and inward from the first selected position of interface element 745, the interface element has been shifted upward to the center of the hot area of the heat map 815 as indicated at 820. The heat maps may continue to be generated and used to further adjust positions.

Figure 9:
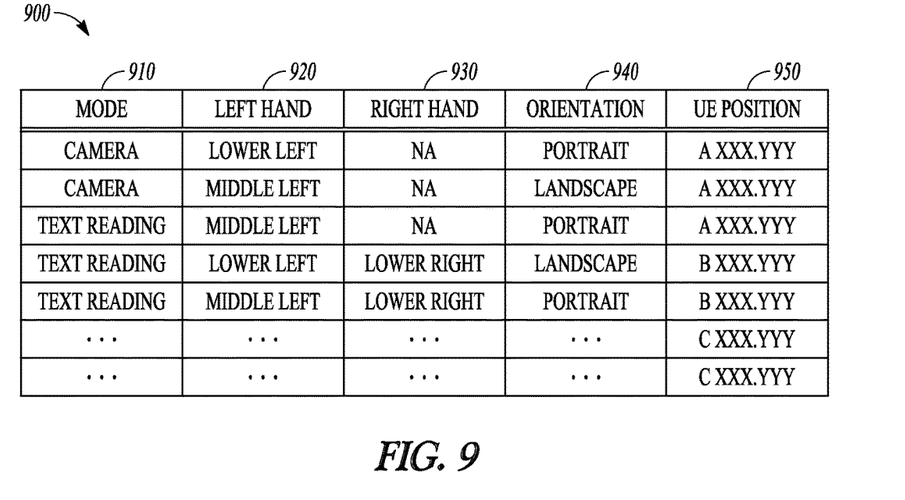
FIG. 9 is a table illustrating one example data structure stored on a computer readable storage device for use by a processor to adjust user interface elements responsive to sensed hand positions according to an example embodiment.

FIG. 9 is a table illustrating one example data structure 900 stored on a computer readable storage device for use by a processor to adjust user interface elements responsive to sensed hand positions. Data structure 900 is represented as a table, but may also be stored as a relational database structure in further embodiments. The table may be used by the processor using the sensed information about the hand positions on the mobile device to obtain locations for interface elements.

A first column 910 may be used to track a context of the mobile device, such as a mode or executing application. The mode may include a camera mode, which may also be thought of as an executing application. Other applications may include browsers, games, word processors, email applications, spreadsheets, and numerous apps available via an app store or other source. The mode may also include a text reading mode, which may be representing by the term text, or a correlated code if desired.

A second column 920 includes position information corresponding to a left hand holding the device. A third column 930 may include position information corresponding to a right hand holding the device. A fourth column 940 may include device orientation, such as portrait or landscape. A fifth column may be used for denoting a user interface element and corresponding position given the sensed data matching the information in the other columns of a row. In table 900, the user interface is identified by a letter. "A" corresponds to a user interface element to capture a picture in camera mode, and "B" corresponds to a text navigation user interface element. The user interface element position (UE POSITION) is denoted as coordinates on the display: "XXX.YYY", which may represent different coordinates for different rows in the table. The user interface element and position may have separate columns, and multiple additional columns may be used for additional user interface elements which may have positions adjusted.

Note that several rows of the table may be used for each application corresponding to different hands and orientations. When determining a user interface element position based on current hand position, there may also be several rows, each corresponding to a different region as discussed previously. Note also that in some embodiments, the user interface position may be determined based on an algorithm depending on where the device is currently being held. In that case, the fifth column may contain the algorithm, or a pointer to the algorithm which utilizes data in one or more of the other columns in the row. Further columns may be provided, such as for example a column corresponding to the sensed finger position described with respect to FIG. 2B above. Additional columns may be provided for further user interface elements, In some embodiments, the hand position information may represent a hot area defined by historical occurrences as a function of frequency and time holding the device, also referred to as the heat map.

Figure 10:
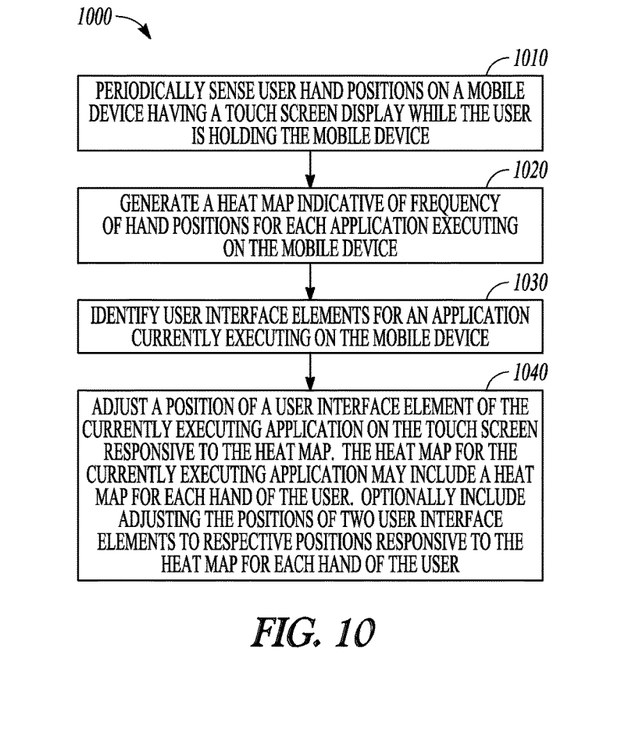
FIG. 10 is a flowchart illustrating a method of adjusting user interface element positions based on heat maps according to an example embodiment.

FIG. 10 is a flowchart illustrating a method 1000 executed by the mobile device. At 1010, method 1000 periodically senses user hand positions on a mobile device having a touch screen display while the user is holding the mobile device. A heat map indicative of frequency of hand positions is generated at 1020 for each application executing on the mobile device. At 1030, the device identifies user interface elements for an application currently executing on the mobile device. At 1040, a position of a user interface element of the currently executing application on the touch screen is adjusted responsive to the heat map. The heat map for the currently executing application may include a heat map for each hand of the user. Adjusting a position of a user interface element at 1040 may include adjusting the positions of two user interface elements to respective positions responsive to the heat map for each hand of the user. In one embodiment, adjusting a position of the user interface element of the currently executing application is performed responsive to a selection of the application for execution by the user of the mobile device.

Figure 11:
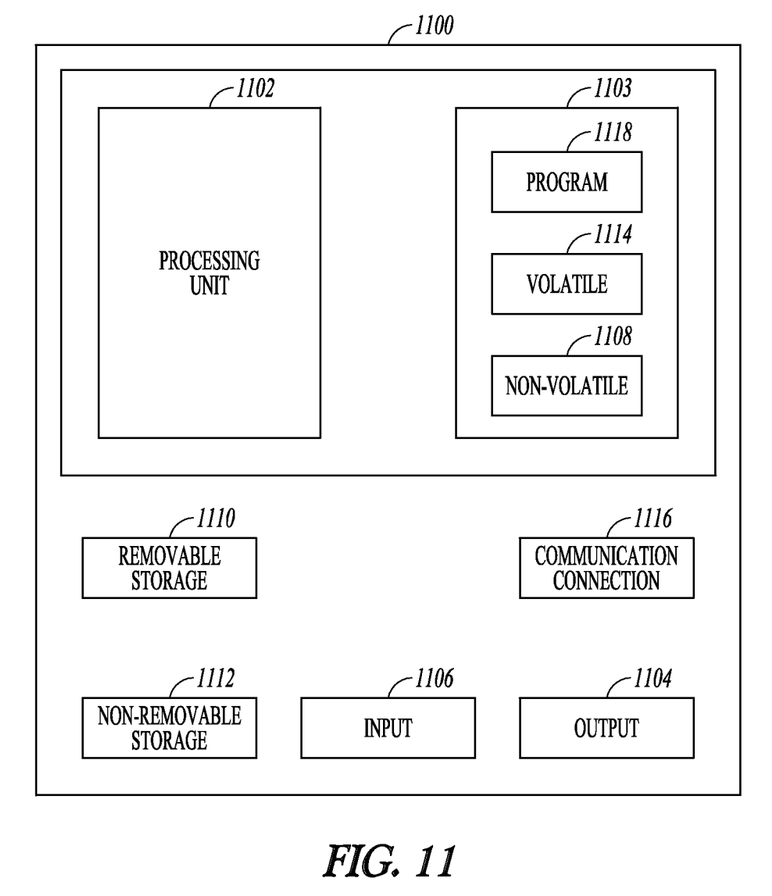
FIG. 11 is an example of mobile device circuitry for performing methods according to example embodiments.

FIG. 11 is a block schematic diagram of a computer system 1100 to implement the processor and memory of the mobile device, as well as executing methods according to example embodiments. All components need not be used in various embodiments. One example computing device in the form of a computer 1100, may include a processing unit 1102, memory 1103, removable storage 1110, and non-removable storage 1112. Although the example computing device is illustrated and described as computer 1100, the computing device may be in different forms in different embodiments. For example, the computing device may instead be a smartphone, a tablet, smartwatch, or other computing device including the same or similar elements as illustrated and described with regard to FIG. 11. Devices such as smartphones, tablets, and smartwatches are generally collectively referred to as mobile devices. Further, although the various data storage elements are illustrated as part of the computer 1100, the storage may also or alternatively include cloud-based storage accessible via a network, such as the Internet.

Memory 1103 may include volatile memory 1114 and non-volatile memory 1108. Computer 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

Computer 1100 may include or have access to a computing environment that includes input 1106, output 1104, and a communication connection 1116. Output 1104 may include a display device, such as a touchscreen, that also may serve as an input device. The input 1106 may include one or more of a touchscreen, touchpad, mouse, keyboard, camera, one or more device-specific buttons, one or more sensors integrated within or coupled via wired or wireless data connections to the computer 1100, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable storage device are executable by the processing unit 1102 of the computer 1100. A hard drive, CD-ROM, and RAM are some examples of articles including a non-transitory computer-readable medium such as a storage device. The terms computer-readable medium and storage device do not include carrier waves. For example, a computer program 1118 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1100 to provide generic access controls in a COM based computer network system having multiple users and servers.

EXAMPLES

1. A method comprising:
   sensing a hand position on a mobile device via sensors on the mobile device;
   providing information identifying the sensed hand position to a processor of the mobile device;
   identifying a position of a user interface on a touch screen display of the mobile device responsive to the information identifying the sensed hand position using the processor of the mobile device; and
   adjusting a user interface display position on the mobile device to the identified position using the processor of the mobile device.

2. The method of example 1 wherein sensing a hand position comprises sensing the mobile device is being held on one side of the mobile device by one hand, and wherein adjusting the user interface display position comprises moving user interface page up and page down buttons to the one side of the mobile device.

3. The method of example 2 wherein the user interface page up and page down buttons are moved proximate the hand holding the side of the mobile device such that the buttons are easily selectable by the hand holding the side of the mobile device.

4. The method of any of examples 1-3 wherein sensing a hand position comprises sensing the mobile device is being held on both sides of the mobile device by two hands, and wherein adjusting the user interface display position comprises moving user interface page up and page down buttons to both sides of the touch screen proximate where the hands are holding the mobile device.

5. The method of any of examples 1-4 wherein sensing a hand position comprises sensing the mobile device is being held on one side of the mobile device by only one hand and wherein adjusting the user interface display position comprises moving a user interface proximate the position of the hand on the one side of the mobile device to facilitate use of the user interface without moving the hand.

6. The method of any of examples 1-5 and further comprising:
   sensing a position of a finger above the touchscreen display;
   providing information identifying the sensed finger position to the processor of the mobile device; and
   wherein identifying a position of a user interface is further responsive to the information identifying the sensed finger position.

7. The method of example 6 wherein sensing a position of a finger above the touchscreen is performed by magnetic field disruption detection.

8. The method of example 6 wherein sensing a position of a finger above the touchscreen is performed by processing images provided by a camera of the mobile device.

9. The method of any of examples 1-8 and further comprising reducing an active touch zone of the user interface responsive to adjusting a user interface display position.

10. The method of any of examples 1-9 and further comprising:
    tracking historic holding patterns for a user of the mobile device; and
    wherein adjusting the user interface display position on the mobile device responsive to the sensed hand position includes adjusting the user interface display position based on the tracked historic holding patterns prior to a user holding the device.

11. The method of example 10 wherein historic holding patterns are tracked for each application and wherein the user interface display position is adjusted for an application based on the historic holding patterns for the application using a table correlating the holding patterns to applications and user interface display positions.

12. The method of example 10 wherein tracking historic holding patterns comprises:
periodically storing information identifying the sensed hand position;
generating a heat map identifying frequency of occurrence of each sensed hand position, wherein a separate heat map is generated for each application executing on the mobile device.

13. The method of example 12 wherein the identified position is identified responsive to the heat maps.

14. A method comprising:
periodically sensing user hand positions on a mobile device having a touch screen display while the user is holding the mobile device;
generating a heat map indicative of frequency of hand positions for each application executing on the mobile device;
identifying a user interface element for an application currently executing on the mobile device; and
adjusting a position of the user interface element of the currently executing application on the touch screen responsive to the heat map for the currently executing application.

15. The method of example 14 wherein the heat map for the currently executing application includes a heat map for each hand of the user.

16. The method of example 15 wherein adjusting a position of a user interface element comprises adjusting the positions of two user interface elements to respective positions responsive to the heat map for each hand of the user.

17. The method of any of examples 14-16 wherein adjusting a position of the user interface element of the currently executing application is performed responsive to a selection of the application for execution by the user of the mobile device.

18. A mobile computing device comprising:
a processor;
a sensor array supported by the mobile computing device, the sensor array positioned to sense hand positions on the mobile computing device by a user using the device; and
a memory device coupled to the processor and having instructions stored thereon executable by the processor to:
receive information identifying the sensed hand positions from the sensor array;
identify an adjusted position of a user interface on a touch screen display of the mobile device responsive to the information identifying the sensed hand positions; and
move a user interface display position on the mobile device to the identified adjusted position.

19. The mobile computing device of example 18 wherein the instructions are executable by the processor to:
receive information identifying a sensed finger position to the processor of the mobile device; and
wherein identifying an adjusted position of a user interface is further responsive to the information identifying the sensed finger position.

20. The mobile computing device of any of examples 18-19 wherein the instructions are executable by the processor to:
track historic holding patterns for a user of the mobile device; and
wherein identifying an adjusted position of the user interface responsive to the sensed hand position includes identifying the adjusted position responsive to the tracked historic holding patterns prior to a user holding the device.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
sensing a hand position of a user on a mobile device via a sensor array comprising a multiplicity of sensors on a housing of the mobile device,
providing information identifying the sensed hand position to a processor of the mobile device;
identifying a position of a user interface on a touch screen display of the mobile device responsive to the information identifying the sensed hand position using the processor of the mobile device;
adjusting a user interface display position on the mobile device to the identified position using the processor of the mobile device;
tracking historic holding patterns for the user of the mobile device;
applying weights to emphasize more recent holding pattern information;
wherein adjusting the user interface display position on the mobile device responsive to the sensed hand position includes adjusting the user interface display position based on the weighted historic holding patterns prior to a user holding the device, wherein tracking historic holding patterns comprises:
periodically storing information identifying the sensed hand position;
generating a holding pattern heat map identifying frequency of occurrence of each sensed hand position, wherein a separate holding pattern heat map is generated for each application executing on the mobile device;
tracking historic attempted selections of user interface elements on the touch screen;
generating a touch screen interaction heat map for one of the user interface elements; and
shifting a position of the one of the user interface elements on the touch screen responsive to the touch screen interaction heat map.

2. The method of claim 1 further comprising displaying a portion of a block of text in a text reading mode, wherein sensing a hand position comprises sensing the mobile device is being held on one side of the mobile device by one hand, and wherein adjusting the user interface display position comprises moving existing user interface page up and page down buttons to the one side of the mobile device to enable navigation up or down through the block of text.

3. The method of claim 2 wherein the user interface page up and page down buttons are moved proximate the hand holding the side of the mobile device.

4. The method of claim 1 further comprising displaying a portion of a block of text in a text reading mode, wherein sensing a hand position comprises sensing the mobile device is being held on both sides of the mobile device by two hands, and wherein adjusting the user interface display position comprises moving user interface page up and page down buttons to both sides of the touch screen proximate where the hands are holding the mobile device to enable navigation up or down through the block of text.

5. The method of claim 1 wherein sensing a hand position comprises sensing the mobile device is being held on one side of the mobile device by only one hand and wherein adjusting the user interface display position comprises moving a user interface proximate the position of the hand on the one side of the mobile device to facilitate use of the user interface without moving the hand.

6. The method of claim 1 and further comprising:
sensing a position of a finger above the touchscreen display;
providing information identifying the sensed finger position to the processor of the mobile device; and
wherein identifying a position of a user interface is further responsive to the information identifying the sensed finger position.

7. The method of claim 6 wherein sensing a position of a finger above the touchscreen is performed by magnetic field disruption detection.

8. The method of claim 6 wherein sensing a position of a finger above the touchscreen is performed by processing images provided by a plurality of cameras of the mobile device, the plurality of cameras including a first camera above the touch screen display and a second camera below the touch screen display.

9. The method of claim 1 and further comprising reducing an active touch zone of the user interface responsive to adjusting a user interface display position.

10. A mobile computing device comprising:
a processor;
a sensor array supported by the mobile computing device, the sensor array positioned to sense hand positions on a housing of the mobile computing device and user selections of interface elements on a touchscreen on the mobile computing device by a user using the device; and
a memory device coupled to the processor and having instructions stored thereon executable by the processor to:
receive information identifying the sensed hand positions from the sensor array;
identify an adjusted position of a selectable user interface display on a touch screen display of the mobile device responsive to the information identifying the sensed hand positions; and
move a user interface display position for the selectable user interface display on the mobile device to the identified adjusted position;
tracking historic holding patterns for the user of the mobile device;
applying weights to emphasize more recent holding pattern information;
wherein adjusting the user interface display position on the mobile device responsive to the sensed hand position includes adjusting the user interface display position based on the weighted historic holding patterns prior to a user holding the device, wherein tracking historic holding patterns comprises:
periodically storing information identifying the sensed hand position;
generating a holding pattern heat map identifying frequency of occurrence of each sensed hand position;
tracking historic attempted selections of user interface elements on the touch screen;
generating a touch screen interaction heat map for one of the user interface elements; and
shifting a position of the one of the user interface elements on the touch screen responsive to the touch screen interaction heat map.

* * * * *